United States Patent Office 3,589,912
Patented June 29, 1971

3,589,912
METHOD OF ROASTING COFFEE
Irwin L. Adler, River Vale, N.J., and Alonzo H. Feldbrugge, New York, N.Y., assignors to General Foods Corporation, White Plains, N.Y.
No Drawing. Filed Apr. 17, 1968, Ser. No. 721,944
Int. Cl. A23f 1/02
U.S. Cl. 99—68    5 Claims

ABSTRACT OF THE DISCLOSURE

Coffee is predried to a moisture content below about 7% by weight under conditions whereby roasting does not occur. The predried coffee is then roasted at a temperature below the critical burning temperature until a substantial part of the roasting is completed. The coffee is next further heated to bring its temperature to the critical burning temperature for a brief period, then rapidly quenched.

BACKGROUND OF THE INVENTION

Coffee roasting is carried out to improve and develop color and flavor. The roasting is continued until a predetermined color, which experience has taught is associated with optimum coffee flavor, is obtained. Expressed another way, the endpoint in coffee roasting is the development of a particular color. Moisture and soluble coffee solids are lost during roasting, or during predrying and roasting if a predrying step is employed. Due to these losses the yield of fully roasted coffee is decreased and the flavor of the coffee is impaired to the extent that soluble coffee solids are lost.

The total predrying and roasting losses including moisture may amount to as much as about 18–20% or more of the weight of the green beans. If losses of soluble solids could be minimized while attaining the same roasting endpoint, there would be considerable cost savings and improved flavor.

OBJECTS OF THE INVENTION

It is, accordingly, an object of the present invention to provide a method for roasting coffee with minimum loss of soluble solids while attaining optimum color and flavor development. Another object is to provide a method for improving the flavor of roasted coffee. A further object is to provide a method for controlling the roasting of coffee. These and other objects of the present invention will be apparent from the following description.

SUMMARY OF THE INVENTION

It has now been found that an improved method for roasting coffee comprises predrying coffee beans to a moisture content below about 7% by weight, under conditions at which roasting does not occur, roasting the coffee at temperatures below the critical burning temperature until a substantial part of the roasting is completed, further heating the coffee to at least the critical burning temperature for a short time, and rapidly quenching the coffee.

DETAILED DESCRIPTION

The present invention comprises the following features:

In a method of roasting coffee, the improvement comprising predrying the coffee to a moisture content below about 7% by weight at a temperature below the roasting temperature at pressures which are at least substantially atmospheric.

In a method of roasting coffee, the improvement comprising initially roasting the coffee in large batches at substantially atmospheric pressure in air at a temperature of about 350° F. or above but below the critical burning temperature until from about 40% to about 70% of the desired final color is obtained and such a method wherein the initial roasting takes place at a temperature of about 350° F. or above but below the range of from about 390° F. to about 440° F.

In a method of roasting coffee, the improvement comprising completing the roasting of the coffee by heating to a temperature above the critical burning temperature, from about 30% to about 60% of the desired final color development being obtained by heating above the critical burning temperature, the critical burning temperature being higher than the temperature at which the prior roasting took place, and such a method wherein the critical burning temperature is above the range of from about 390° F. to about 440° F.

In a method of roasting coffee wherein after predrying, to a moisture content below about 7% by weight at a temperature below the roasting temperature at pressures which are at least substantially atmospheric, the coffee is roasted, the improvement comprising completing the roasting of the coffee by heating to a temperature above the critical burning temperature, from about 30% to about 60% of the desired final color development being obtained by heating above the critical burning temperature, the critical burning temperature being higher than the temperature at which the prior roasting took place.

In a method of roasting coffee wherein the coffee is predried to a moisture content below about 7% by weight at a temperature below the roasting temperature at pressures which are at least substantially atmospheric, the improvement comprising completing the roasting of the coffee by heating to a temperature above the critical burning temperature and below about 600° F. until from about 30% to about 60% of the desired final color is obtained.

Preferably, the coffee is predried to a moisture content below about 3%.

The predrying according to the present invention takes place at temperatures which are below the roasting temperature of coffee. Roasting is defined as that temperature at which the Maillard reaction occurs. As coffee, like all natural products, is variable in quality, the temperature at which this reaction occurs will vary depending on the particular coffee being treated. Generally, however, temperatures of about 230° F., or above, are required.

The predrying step of the present invention may take place under atmospheric, or superatmospheric conditions, in the presence of air, or an inert atmosphere. The beans may be agitated if desired, for example, by stirring, tumbling, or by employing a fluidized bed. It is essential that the temperature be maintained below that temperature at which roasting occurs. The drying is carried out until the moisture content of the beans is below about 7% by weight and preferably below about 3% by weight.

The predried beans, preferably without being cooled, are roasted by heating to a temperature at which the Maillard reaction takes place but below the critical burning temperature. The critical burning temperature is defined as that temperature at which carbon dioxide is liberated from the coffee. This critical burning temperature varies with the particular coffee being treated but generally is in the temperature range of from about 390° F. to about 440° F. It may be readily determined for a particular coffee by heating a sample of the coffee in a pressure vessel and recording that temperature at which a sudden sharp increase in pressure occurs. In general, the critical burning temperature of high quality coffee will be higher than that of poorer quality coffee. The predried beans are roasted at a temperature below the critical burning temperature until a substantial part of the roasting is completed. According to the present invention, the predried coffee is roasted at a temperature below the critical burning temperature until from about 40% to about 70% of the final desired color is completed. This color development corresponds to what is known in the trade as a "peanut" roast. There is some color development: the beans have a brownish hue but do not have a fully developed flavor.

The temperature of the partially roasted coffee is then increased to above the critical burning temperature for a very short time relative to the time the coffee has been roasted below its critical burning temperature, and then rapidly quenched. The time during which the temperature of the coffee is permitted to exceed the critical burning temperature is very short, generally less than about 2 minutes, and preferably less than about one minute. Most preferably the time is from about 10 seconds to about 40 seconds. The maximum temperature of the beans in this step should not exceed about 600° F. During this step the roasting is completed and final development of color and flavor takes place to produce what is known in the trade as "normal" roast.

After completion of the roasting operation, the coffee is rapidly quenched in water or cool air.

Coffee roasted according to the present invention will reach the same roast end point as conventionally roasted coffee but will have a greatly lessened loss of soluble solids. This results in greater yield of roasted coffee per unit of green beans fed to the roaster, as well as better coffee flavor due to retention of more of the soluble solids. Beans which are predried according to the present invention roast faster than beans which have not been predried. If roasted for the same time as in conventional roasting techniques, a denser product is obtained.

The following examples illustrates the present invention without, however, limiting the same thereto.

EXAMPLE

A quantity of green coffee beans having a moisture content of of 12% by weight were heated for 21 minutes in a fluidized bed at a temperature of 200° F. At the end of this time, the beans had a moisture content of 3% by weight.

The beans were further heated at 430° F. until they had reached a "peanut" roast color. At this point the temperature of the inlet air was increased to a temperature of 550° F. Heating at this temperature was continued for 25 seconds to produce a normal roast color. The beans were then immediately quenched in cool air. The beans had an overall weight loss of only 4.8% compared to the dry weight of the starting beans. With conventional roasting techniques, the roasting loss would have been about 9%.

It will be understood that the foregoing description with the details of exemplary structure is not to be construed in any way to limit the invention, but that modification may be made thereto without departing from the scope of the invention as set forth in the following claims.

What we claim is:

1. A method of roasting coffee which reduces the overall weight loss comprising (a) predrying the coffee to a moisture content below about 7% by weight at temperatures below the roasting temperature and at pressures which are at least atmospheric, (b) initially roasting the coffee at substantially atmospheric pressure in air at a temperature of about 350° F. or above but below the critical burning temperature until about 40% to about 70% of the desired final color is obtained, and (c) completing the roasting within less than 1 minute by heating in a fluidized bed to a temperature above the critical burning temperature, until about 30% to about 60% of the desired final color is obtained; the critical burning temperature being higher than the temperature at which the prior roasting took place.

2. The method of claim 1 wherein the initial roasting takes place at a temperature of about 350° F. or above but below the range of from about 390° F. to about 440° F.

3. The method of claim 1 wherein the critical burning temperature is above the range of from about 390° F. to about 440° F.

4. A method according to claim 1 wherein roasting is completed by heating the coffee at a temperature above the critical burning temperature and below about 600° F. until from about 30% to about 60% of the desired final color is obtained.

5. A method according to claim 1 wherein the coffee is predried to a moisture content below about 3%.

References Cited
UNITED STATES PATENTS

| | | | |
|---|---|---|---|
| 1,496,932 | 6/1924 | Gross | 99—68X |
| 2,189,206 | 2/1940 | Griffin | 34—5 |
| 2,282,708 | 5/1942 | Dantzig | 99—68 |
| 2,307,710 | 1/1943 | Polin et al. | 99—68 |
| 2,389,577 | 11/1945 | O'Toole et al. | 99—68 |
| 2,572,679 | 10/1951 | Torres | 99—68 |
| 2,581,148 | 1/1952 | Scoll, 2nd, et al. | 99—68 |
| 2,857,683 | 10/1958 | Schytil | 34—57 |
| 3,088,825 | 5/1963 | Topalian et al. | 99—68 |
| 3,106,470 | 10/1963 | Spotholz | 99—68 |
| 3,122,439 | 2/1964 | MacAllister et al. | 99—68 |
| 3,408,920 | 11/1968 | Smith, Jr. | 99—236 |

DENNIS E. TALBERT, JR., Primary Examiner

U.S. Cl. X.R.

34—10, 13; 99—199